(12) United States Patent
Feng et al.

(10) Patent No.: US 12,060,718 B2
(45) Date of Patent: Aug. 13, 2024

(54) CONCRETE POURING GUIDING DEVICE AND CONSTRUCTION METHOD FOR SEWAGE TREATMENT TANK

(71) Applicant: China Eleventh Chemical Construction Co., Ltd., Henan (CN)

(72) Inventors: Cheng Feng, Henan (CN); Changwei Wang, Henan (CN); Yongchang Zhang, Henan (CN); Honghua Gao, Henan (CN); Wenliang Zhang, Henan (CN); Chunhua Yuan, Henan (CN)

(73) Assignee: China Eleventh Chemical Construction Co., Ltd., Henan (CN)

( * ) Notice: Subject to any disclaimer, the term of this patent is extended or adjusted under 35 U.S.C. 154(b) by 268 days.

(21) Appl. No.: 17/233,209

(22) Filed: Apr. 16, 2021

(65) Prior Publication Data

US 2022/0213703 A1    Jul. 7, 2022

(51) Int. Cl.
*E04G 21/02* (2006.01)
*E03F 5/18* (2006.01)
*E04G 21/04* (2006.01)

(52) U.S. Cl.
CPC ......... *E04G 21/02* (2013.01); *E04G 21/0418* (2013.01); *E03F 5/18* (2013.01)

(58) Field of Classification Search
CPC ..... E04G 21/02; E04G 21/04; E04G 21/0472; E04G 21/0481; E04G 11/02; E04G 13/02;
(Continued)

(56) References Cited

U.S. PATENT DOCUMENTS 1,094,113 A * 4/1914 Bissen ............... E21B 7/046
294/16
3,851,485 A * 12/1974 Steding ............... E02D 15/04
222/154
(Continued)

FOREIGN PATENT DOCUMENTS

CN   109176863 A  *  1/2019
CN   210917378 U  *  7/2020
(Continued)

OTHER PUBLICATIONS

Machine English translation of Byoung et al. (KR20100060445A) (Year: 2010).*
(Continued)

*Primary Examiner* — Jeffrey M Wollschlager
*Assistant Examiner* — Edgaredmanuel Troche
(74) *Attorney, Agent, or Firm* — Neal, Gerber & Eisenberg LLP (57) ABSTRACT

Provided are a concrete pouring guiding device and a construction method for pouring a concrete tank wall of a sewage treatment tank, wherein the concrete pouring guiding device includes a guiding element and a mounting seat configured to be fixed on an external mounting position; the guiding element is threadedly engaged with the mounting seat, so as to enable the guiding element to move in a first direction with respect to the mounting seat; in the first direction, one end of the guiding element is configured to allow concrete to flow into the guiding element, and the other end of the guiding element is configured to extend to a target position; and the first direction is a length direction of the guiding element.

13 Claims, 4 Drawing Sheets

(58) Field of Classification Search
CPC ... E04G 21/0418; E04G 17/002; E04G 11/22; E02D 15/04; E02D 15/00; E02D 15/02; E02D 2250/003; B28B 21/06; B28B 21/18; B28B 21/26; B28B 7/168; B28B 19/0023; B28B 21/22; E03F 5/04
USPC .................. 425/333, 337; 264/269; 249/22
See application file for complete search history.

(56) References Cited

U.S. PATENT DOCUMENTS

| | | | | |
|---|---|---|---|---|
| 4,321,223 | A | * | 3/1982 | Nakahara ............... E02D 15/04 264/32 |
| 6,668,497 | B1 | * | 12/2003 | Mayer ..................... B66C 23/68 248/219.2 |
| 2016/0305084 | A1 | * | 10/2016 | Steff De Verninac ........................ E02D 17/13 |

FOREIGN PATENT DOCUMENTS

| | | | | | |
|---|---|---|---|---|---|
| CN | 112873515 | A | * | 6/2021 | ............ B28B 13/02 |
| KR | 2010060445 | A | * | 6/2010 | |
| KR | 1857247 | B1 | * | 5/2018 | ........... E04G 25/065 |

OTHER PUBLICATIONS

Machine English translation of Dong Min, Lee et al. (KR20100060445A) (Year: 2018).*
NPL2, McElroy Manufacturing, Inc. "2IPS Socket Ftg Holder Assembly", retrieved form https://www.polypipesupply.com/products/sw07101 (Year: 2000).*
NPL1, "Grout", retrieved from https://web.archive.org/web/20201111202425/https://en.wikipedia.org/wiki/Grout (Year: 2020).*
Machine English translation of Zhang (CN-210917378-U) (Year: 2020).*
Non-patent literature NBK ("Description of Clamping Screws for Engineers; Couplings, Screws, Clampers") (Year: 2016).*
Machine English translation of Choi et al. (KR20100060445A) (Year: 2010).*
Machine English translation of Cai (CN-109176863-A) (Year: 2019).*

* cited by examiner

CONCRETE POURING GUIDING DEVICE AND CONSTRUCTION METHOD FOR SEWAGE TREATMENT TANK

CROSS-REFERENCE TO RELATED APPLICATION

This application claims priority to Chinese Patent Application No. 2021100159569, filed with the Chinese Patent Office on Jan. 6, 2021, entitled "Concrete Pouring Guiding Device and Construction Method for Sewage Treatment Tank", which is incorporated herein by reference in its entirety.

TECHNICAL FIELD

The present disclosure relates to the technical field of construction engineering, in particular, to a concrete pouring guiding device and a sewage treatment tank; and may also be used for construction of other concrete wallboards or pillar concrete.

BACKGROUND ART

The sewage treatment of oil refining and chemical projects mostly adopts the Degremont technology in our country, in which the sewage treatment process and the refining process or the chemical process are sufficiently combined to form one process, so that "waste" is used to treat "waste", and the "waste" is changed into valuable. The sewage treatment plant is both their terminal, and start point, which not only reduces the direct operation cost of enterprises, but also effectively reduces emission of contaminants. In the construction process of the sewage treatment tank, it is important to control the construction quality of the tank, and prevent the tank from leaking, which contaminates the environment, and affects the service life of the project. In the conventional concrete pouring process, the concrete is directly delivered into the tank wall, but in the delivering process, subjected to an impact force and blocked by the steel bar framework, or the concrete may be ultrahigh and get segregated, thus severely affecting the construction quality.

SUMMARY

In one aspect, the present disclosure provides a concrete pouring guiding device, including a guiding element and a mounting seat configured to be fixed on an external mounting position; the guiding element is threadedly engaged with the mounting seat, so as to enable the guiding element to move in a first direction with respect to the mounting seat; in the first direction, one end of the guiding element is configured to allow concrete to flow into the guiding element, and the other end of the guiding element is configured to extend to a target position; and the first direction is a length direction of the guiding element.

In another aspect, the present disclosure provides a construction method for a sewage treatment tank, wherein the method is implemented by applying the concrete pouring guiding device provided in the present disclosure, and the method includes:

forming a tank wall steel bar structure by binding;
mounting a tank wall template, so that the tank wall steel bar structure is located between two tank wall templates that are provided opposite to each other;
making the guiding element of the concrete pouring guiding device protrude into between the two tank wall templates that are provided opposite to each other, arranging the bottom end of the guiding element close to the target position, and detachably fixing the mounting seat on the tank wall templates; and
pouring the concrete into the guiding element from the top end of the guiding element, and moving the guiding element with the rising of a concrete grout surface between the two tank wall templates that are provided opposite to each other, so that the bottom end of the guiding element gradually approaches the mounting seat until the concrete pouring for the target position is completed.

BRIEF DESCRIPTION OF DRAWINGS

In order to more clearly illustrate technical solutions of embodiments of the present disclosure, accompanying drawings which need to be used in the description of the embodiments will be introduced below briefly. Apparently, the accompanying drawings in the description below are for some embodiments of the present disclosure, and a person ordinarily skilled in the art still could obtain other relevant accompanying drawings according to these accompanying drawings, without using any creative efforts.

REFERENCE SIGNS

100—concrete pouring guiding device;
110—funnel-shaped end portion;
120—handle assembly;
121—handle;
122—arc-shaped clamping sheet;
123—bolt;
130—guiding element;
131—smooth outer wall;
132—external thread section;
140—mounting seat;
141—clamping groove;
150—locking bolt;
160—clamping block;
200—steel bar mesh unit;
300—tank wall template;
400—wedge-shaped wood block;
500—waterstop belt.

DETAILED DESCRIPTION OF EMBODIMENTS

Technical solutions of the present disclosure will be described below clearly and completely in connection with accompanying drawings. Apparently, the embodiments described are only some but not all embodiments of the present disclosure. All of other embodiments obtained by those ordinarily skilled in the art based on the embodiments in the present disclosure without using any creative efforts shall fall within the scope of protection of the present disclosure.

In the description of the present disclosure, it should be indicated that orientation or positional relations indicated by terms "center", "upper", "lower", "left", "right", "vertical", "horizontal", "inner", "outer" and so on are based on orientation or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying importance in the relativity.

In the description of the present disclosure, it should be indicated that unless otherwise specified and defined explicitly, terms "mount", "join", "connect" should be construed in a broad sense. For example, it may be fixed connection, detachable connection, or integral connection; it may be mechanical connection, and also may be electrical connection; it may be direct connection, indirect connection via an intermediate medium, or inner communication between two elements. For those ordinarily skilled in the art, specific meanings of the above-mentioned terms in the present disclosure could be understood according to specific circumstances.

An objective of the present disclosure lies in providing a concrete pouring guiding device and a construction method for a sewage treatment tank for the problem that in the conventional concrete pouring process, the concrete is directly delivered into the tank wall, but in the delivering process, subjected to an impact force and blocked by the steel bar framework, or the concrete may be ultrahigh and get segregated, thus severely affecting the construction quality.

In order to achieve the above objective, the present disclosure adopts the following technical solution.

In one aspect, the present disclosure provides a concrete pouring guiding device, including a guiding element and a mounting seat configured to be fixed on an external mounting position; the guiding element is threadedly engaged with the mounting seat, so as to enable the guiding element to move in a first direction with respect to the mounting seat; in the first direction, one end of the guiding element is configured to allow concrete to flow into the guiding element, and the other end of the guiding element is configured to extend to a target position; and the first direction is a length direction of the guiding element.

Optionally, the mounting seat is provided with two clamping grooves, the two clamping grooves are symmetrically provided on two sides of the guiding element in a second direction, and the clamping grooves are configured to be snap-fitted with the external mounting position.

As the external mounting position is usually the tank wall template, the snap-fit between the clamping grooves and the tank wall template can realize quick installation and disassembly of the concrete pouring guiding device, and can overcome the torque acting on the mounting seat in the process of rotating the guiding element, so that the mounting seat is fixed more securely.

Optionally, a clamping block is provided in the clamping groove, the concrete pouring guiding device further includes a locking bolt, a threaded hole cooperating with the locking bolt is formed in the mounting seat, the locking bolt extends through the threaded hole into the clamping groove, and the locking bolt is movably connected to the clamping block, so that the clamping block is movable in the second direction driven by the locking bolt.

After the clamping groove is snap-fitted with the tank wall template, the clamping block may be driven to move by rotating the locking bolt, so that the clamping block moves in the second direction to extrude the tank wall template, then the tank wall template is firmly locked in the clamping grove. When the mounting seat needs to be dismounted from the tank wall template, the locking bolt is rotated to drive the clamping block to move in a direction away from the tank wall template, so as to release the extrusion to the tank wall template, so that the mounting seat is easily separated from the tank wall template.

Optionally, the clamping block has an extrusion surface configured to cooperate with the tank wall template, and the extrusion surface is a plane.

Optionally, the concrete pouring guiding device further includes a locking bolt, a threaded hole cooperating with the locking bolt is formed in the mounting seat, the locking bolt extends through the threaded hole into the clamping groove, two locking bolts are mounted at one clamping groove, and the two locking bolts are provided opposite to each other.

The tightness of cooperation between the clamping block and the tank wall template is increased, further improving the reliability of the connection between the mounting seat and the tank wall template.

Optionally, in the first direction, a middle part of the guiding element is an external thread section, and two ends of the guiding element in the first direction both have a smooth outer wall.

The external thread section can form threaded fitting with the mounting seat, and as one end of the guiding element is used to receive the concrete, and the other end is used to transmit the concrete to the target position, the external wall may be in direct contact with the concrete, then providing the smooth outer wall makes it difficult for the concrete to hang on the guiding element, so that the guiding element maintains a certain degree of cleanliness, and further the concrete pouring guiding device can operate well. In an embodiment of the present disclosure, the guiding element is preferably a cylindrical member, and certainly, the guiding element may also has a cross section that is of a polygonal shape such as a triangular shape or a quadrilateral shape, and only the middle part and/or lower half section of the guiding element is in a cylindrical structure having an external thread.

Optionally, in the first direction, one end of the guiding element for the concrete to flow in is a funnel-shaped end portion.

This allows easier and more accurate insertion of an external feeding device into the guiding element when the concrete is delivered into the guiding element, improving the construction efficiency.

Optionally, a handle assembly is mounted on the guiding element, the handle assembly includes two arc-shaped clamping sheets and two handles; the two arc-shaped clamping sheets are connected to each other through a bolt, and a concave side of one of the arc-shaped clamping sheets is provided opposite to a concave side of the other one of the arc-shaped clamping sheets, so that the guiding element is clamped between the two arc-shaped clamping sheets; and the two arc-shaped clamping sheets are each mounted with one handle.

The two arc-shaped clamping sheets are connected by the bolt, then the force of the two arc-shaped clamping sheets clamping the guiding element may be adjusted by adjusting the bolt, and by providing two handles, workers may hold one handle with each hand for operation, thus facilitating the construction.

Optionally, the guiding element includes a receiving cylinder and a guiding cylinder sleeved together, so that the receiving cylinder and the guiding cylinder are movable relative to each other in the first direction; and an external thread cooperating with the mounting seat is formed on the outer wall of the guiding cylinder.

In use, a top end of the receiving cylinder may be immobile, while by rotating the guiding cylinder, the guiding cylinder is enabled to move in the same direction relative to the receiving cylinder in the process of moving relative to the mounting seat, thereby realizing the telescopic movement of the entirety of the guiding element, thus the external feeding device does not need to move cooperatively due to the movement of the entirety of the guiding element, thereby increasing the convenience for pouring the concrete.

Optionally, a rotation handle for rotating the guiding cylinder is fixed on the guiding cylinder, and a fixed handle is fixed on the receiving cylinder.

In the process of pouring the concrete, the fixed handle may be manually grasped, or the fixed handle is fixed at the external mounting position, then the rotation handle is moved as the concrete pouring proceeds, thus realizing the movement of the guiding cylinder relative to the receiving cylinder and the mounting seat In another aspect, the present disclosure provides a concrete pouring mould, including a tank wall template, a tank wall steel bar structure fixed to the foundation, and the concrete pouring guiding device provided in the present disclosure, wherein the tank wall steel bar structure and a bottom end of the guiding element are located between two tank wall templates that are provided opposite to each other, and the mounting seat is detachably fixed to the tank wall templates.

In a third aspect, the present disclosure provides a construction method for a sewage treatment tank, wherein the method is implemented by applying the concrete pouring guiding device provided in the present disclosure, and the method includes:

forming a tank wall steel bar structure by binding;
mounting a tank wall template, so that the tank wall steel bar structure is located between two tank wall templates that are provided opposite to each other;
making the guiding element of the concrete pouring guiding device protrude into between the two tank wall templates that are provided opposite to each other, arranging the bottom end of the guiding element close to the target position, and detachably fixing the mounting seat on the tank wall templates; and
pouring the concrete into the guiding element from the top end of the guiding element, and moving the guiding element with the rising of a concrete grout surface between the two tank wall templates that are provided opposite to each other, so that the bottom end of the guiding element gradually approaches the mounting seat until the concrete pouring for the target position is completed.

Optionally, the tank wall steel bar structure includes two steel bar mesh units provided in parallel to each other;

the making the guiding element of the concrete pouring guiding device protrude into between the two tank wall templates that are provided opposite to each other, providing the bottom end of the guiding element close to the target position, and detachably fixing the mounting seat on the tank wall templates includes
making the guiding element of the concrete pouring guiding device protrude into between two steel bar mesh units provided in parallel to each other, and providing the bottom end of the guiding element close to the target position; and
detachably fixing the mounting seat to the two tank wall templates.

Optionally, before the mounting a tank wall template, so that the tank wall steel bar structure is located between the two tank wall templates that are provided opposite to each other, the method further includes:
fixing a waterstop belt between two steel bar mesh units that are provided in parallel to each other;
correspondingly, the mounting a tank wall template, so that the tank wall steel bar structure is located between the two tank wall templates that are provided opposite to each other includes:
providing, in a direction perpendicular to the steel bar mesh units, the tank wall templates on two sides of the tank wall steel bar structure; and
mounting a wedge-shaped wood block on a board surface of a side of the tank wall template facing the tank wall steel bar structure, so that a position of the wedge-shaped wood block corresponds to a position of the waterstop belt.

Optionally, after the pouring the concrete into the guiding element from the top end of the guiding element, and moving the guiding element with the rising of the concrete grout surface between the two tank wall templates that are provided opposite to each other, so that the bottom end of the guiding element gradually approaches the mounting seat until the concrete pouring for the target position is completed, the method further includes:
removing the tank wall templates and the wedge-shaped wood block, so that a contraction joint is formed at a position corresponding to the wedge-shaped wood block on the solidified concrete, and filling a waterproof material in the contraction joint. The contraction joint is generally a groove contraction joint.

The technical solutions provided in the present disclosure may achieve the following beneficial effects:

for the concrete pouring guiding device and the construction method for a sewage treatment tank provided in the present disclosure, by directly sending the concrete to the target position in the process of pouring the concrete, the concrete can bypass the steel bar framework in the dropping process, thereby reducing the impact force and reducing the production of segregation. Meanwhile, the bottom end of the guiding element is hardly blocked by the concrete grout surface by moving the guiding element relative to the mounting seat, so that the concrete pouring can be carried out smoothly, and the construction efficiency is ensured.

The additional technical features and advantages thereof of the present disclosure will be illustrated more apparently in the following description, or may be understood from specific practice of the present disclosure.

Figure 2:
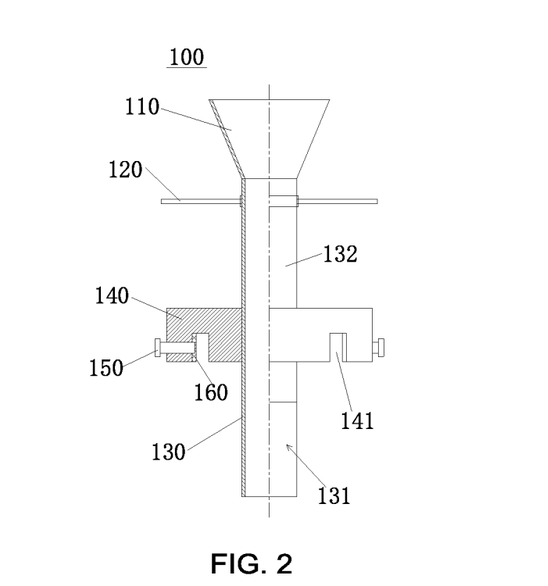
FIG. 2 is a front structural schematic view of an embodiment of a concrete pouring guiding device provided in an embodiment of the present disclosure.
Figure 3:
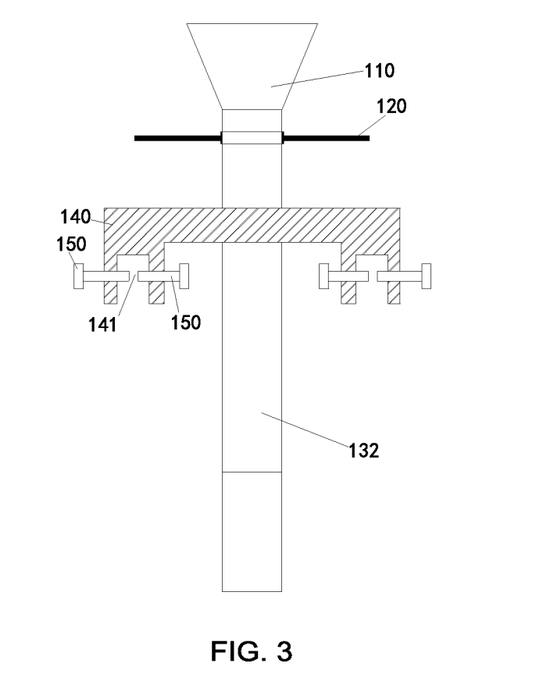
FIG. 3 is a front structural schematic view of another embodiment of the concrete pouring guiding device provided in an embodiment of the present disclosure.
Figure 4:
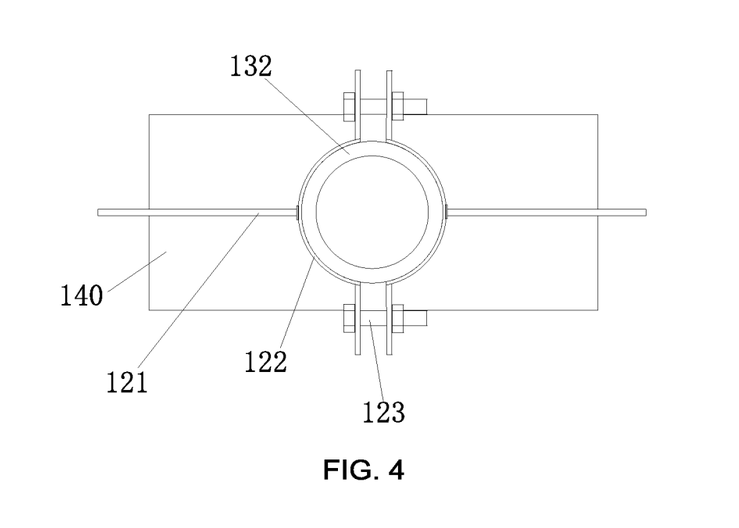
FIG. 4 is a top structural schematic view of an embodiment of the concrete pouring guiding device provided in an embodiment of the present disclosure.

As shown in FIG. 2 to FIG. 4, in one aspect, the present disclosure provides a concrete pouring guiding device 100, including a guiding element 130 and a mounting seat 140 configured to be fixed on an external mounting position; the guiding element 130 is threadedly engaged with the mounting seat 140, so as to enable the guiding element 130 to move in a first direction with respect to the mounting seat 140; in the first direction, one end of the guiding element 130 is configured to allow concrete to flow into the guiding element 130, and the other end of the guiding element 130 is configured to extend to a target position, wherein the first direction is a length direction of the guiding element 130.

For the concrete pouring guiding device 100 provided in the embodiment of the present disclosure, in use, before concrete is poured, the guiding element 130 is first extended between tank wall templates 300 at two sides, and a bottom end of the guiding element 130 is extended to a target position, then, the mounting seat 140 is fixed on the tank wall templates 300, so that the mounting seat 140 is not easily moved in the process of moving the guiding element 130. After the concrete pouring guiding device 100 is fixed, the concrete is poured from a top end of the guiding element 130, and in the process of pouring the concrete, the rising of the concrete grout surface between the tank wall templates 300 at the two sides intermittently or continuously rotates the guiding element 130, so that the guiding element 130 gradually moves upwards in the first direction (in this case, a vertical direction or an approximate vertical direction) relative to the mounting seat 140, that is to say, one end of the guiding element 130 for extending to the concrete to be poured gradually moves towards the position where the mounting seat 140 is located, until the concrete pouring is completed, thus avoiding the concrete grout surface from blocking the bottom end of the guiding element 130.

For the concrete pouring guiding device 100 provided in the embodiment of the present disclosure, by directly sending the concrete to the target position in the process of pouring the concrete, the concrete can bypass the steel bar framework in the dropping process, thereby reducing the impact force and reducing the production of segregation. Meanwhile, the bottom end of the guiding element 130 is hardly blocked by the concrete grout surface by moving the guiding element 130 relative to the mounting seat 140, so that the concrete pouring can be carried out smoothly, and the construction efficiency is ensured.

Optionally, the mounting seat 140 is provided with two clamping grooves 141, the two clamping grooves 141 are symmetrically provided on two sides of the guiding element 130 in a second direction, and the clamping grooves 141 are configured to be snap-fitted with the external mounting position. As the external mounting position is usually the tank wall template 300, the snap-fit between the clamping grooves 141 and the tank wall template 300 can realize quick installation and disassembly of the concrete pouring guiding device 100, and can overcome the torque acting on the mounting seat 140 in the process of rotating the guiding element 130, so that the mounting seat 140 is fixed more securely.

Optionally, a clamping block 160 is provided in the clamping groove 141, the concrete pouring guiding device 100 further includes a locking bolt 150, a threaded hole cooperating with the locking bolt 150 is formed in the mounting seat 140, the locking bolt 150 extends through the threaded hole into the clamping groove 141, and the locking bolt 150 is movably connected to the clamping block 160, so that the clamping block 160 can move in the second direction driven by the locking bolt 150. After the clamping groove 141 is snap-fitted with the tank wall template 300, the clamping block 160 may be driven to move by rotating the locking bolt 150, so that the clamping block 160 moves in the second direction to extrude the tank wall template 300, then the tank wall template 300 is firmly locked in the clamping grove 141. When the mounting seat 140 needs to be dismounted from the tank wall template 300, the locking bolt 150 is rotated to drive the clamping block 160 to move in a direction away from the tank wall template 300, so as to release the extrusion to the tank wall template 300, so that the mounting seat 140 is easily separated from the tank wall template 300.

Optionally, the clamping block 160 has an extrusion surface configured to cooperate with the tank wall template 300, and the extrusion surface is a plane. The tightness of cooperation between the clamping block 160 and the tank wall template 300 is increased, further improving the reliability of the connection between the mounting seat 140 and the tank wall template 300.

Optionally, the concrete pouring guiding device 100 further includes a locking bolt 150, a threaded hole cooperating with the locking bolt 150 is formed in the mounting seat 140, the locking bolt 150 extends through the threaded hole into the clamping groove 141, two locking bolts 150 are mounted at one clamping groove 141, and the two locking bolts 150 are provided opposite to each other.

Optionally, in the first direction, a middle part of the guiding element 130 is an external thread section 132, and two ends of the guiding element 130 in the first direction both have a smooth outer wall 131. The external thread section 132 can form threaded fitting with the mounting seat 140, and as one end of the guiding element 130 is used to receive the concrete, and the other end is used to transmit the concrete to the target position, the external wall may be in direct contact with the concrete, then providing the smooth outer wall 131 makes it difficult for the concrete to hang on the guiding element 130, so that the guiding element 130 maintains a certain degree of cleanliness, and further the concrete pouring guiding device 100 can operate well. In an embodiment of the present disclosure, the guiding element 130 is preferably a cylindrical member, and certainly, the guiding element 130 may also has a cross section that is of a polygonal shape such as a triangular shape or a quadrilateral shape, and only the middle part and/or lower half section of the guiding element 130 is in a cylindrical structure having an external thread.

Optionally, in the first direction, one end of the guiding element 130 for the concrete to flow in is a funnel-shaped end portion 110. This allows easier and more accurate insertion of an external feeding device into the guiding element 130 when the concrete is delivered into the guiding element 130, improving the construction efficiency.

Optionally, a handle assembly 120 is mounted on the guiding element 130, wherein the handle assembly 120 includes two arc-shaped clamping sheets 122 and two handles 121; the two arc-shaped clamping sheets 122 are connected to each other through a bolt 123, and a concave side of one of the arc-shaped clamping sheets 122 is provided opposite to a concave side of the other one of the arc-shaped clamping sheets 122, so that the guiding element 130 is clamped between the two arc-shaped clamping sheets 122; and the two arc-shaped clamping sheets 122 are each mounted with one handle 121. The two arc-shaped clamping sheets 122 are connected by the bolt 123, then the force of the two arc-shaped clamping sheets 122 clamping the guiding element 130 may be adjusted by adjusting the bolt, and by providing two handles 121, workers may hold one handle 121 with each hand for operation, thus facilitating the construction.

Optionally, the guiding element 130 includes a receiving cylinder and a guiding cylinder sleeved together, so that the receiving cylinder and the guiding cylinder can move relative to each other in the first direction; and an external thread cooperating with the mounting seat 140 is formed on the outer wall of the guiding cylinder. In use, a top end of the receiving cylinder may be immobile, while by rotating the guiding cylinder, the guiding cylinder is enabled to move in the same direction relative to the receiving cylinder in the process of moving relative to the mounting seat 140, thereby realizing the telescopic movement of the entirety of the guiding element 130, thus the external feeding device does not need to move cooperatively due to the movement of the entirety of the guiding element 130, thereby increasing the convenience of the concrete pouring.

Optionally, a rotation handle for rotating the guiding cylinder is fixed on the guiding cylinder, and a fixed handle is fixed on the receiving cylinder. In the process of pouring the concrete, the fixed handle may be manually grasped, or the fixed handle is fixed at the external mounting position, then the rotation handle is moved as the concrete pouring proceeds, thus realizing the movement of the guiding cylinder relative to the receiving cylinder and the mounting seat 140.

Figure 1:
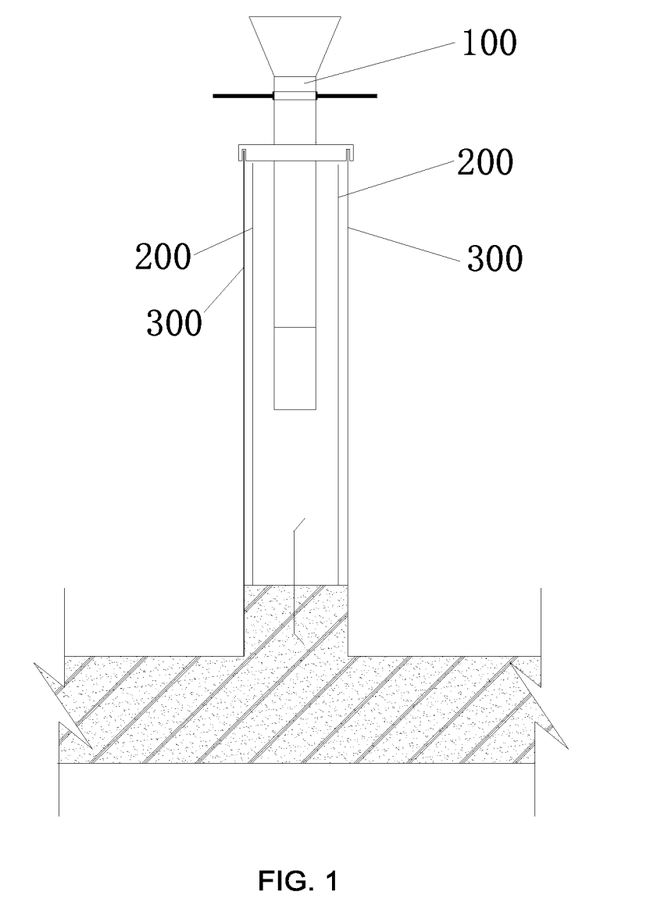
FIG. 1 is a structural schematic view of an embodiment of a concrete pouring mould provided in an embodiment of the present disclosure.

As shown in FIG. 1, in another aspect, the present disclosure provides a concrete pouring mould, including a tank wall template 300, a tank wall steel bar structure fixed to the foundation, and the concrete pouring guiding device 100 provided in the embodiments of the present disclosure, wherein the tank wall steel bar structure and a bottom end of the guiding element 130 are located between two tank wall templates 300 that are provided opposite to each other, and the mounting seat 140 is detachably fixed to the tank wall templates 300.

For the concrete pouring mould provided in the embodiment of the present disclosure, the concrete pouring guiding device 100 provided in an embodiment of the present disclosure is adopted, wherein by directly sending the concrete to the target position in the process of pouring the concrete, the concrete can bypass the steel bar framework in the dropping process, thereby reducing the impact force and reducing the production of segregation. Meanwhile, the bottom end of the guiding element 130 is hardly blocked by the concrete grout surface by moving the guiding element 130 relative to the mounting seat 140, so that the concrete pouring can be carried out smoothly, and the construction efficiency is ensured.

Figure 6:
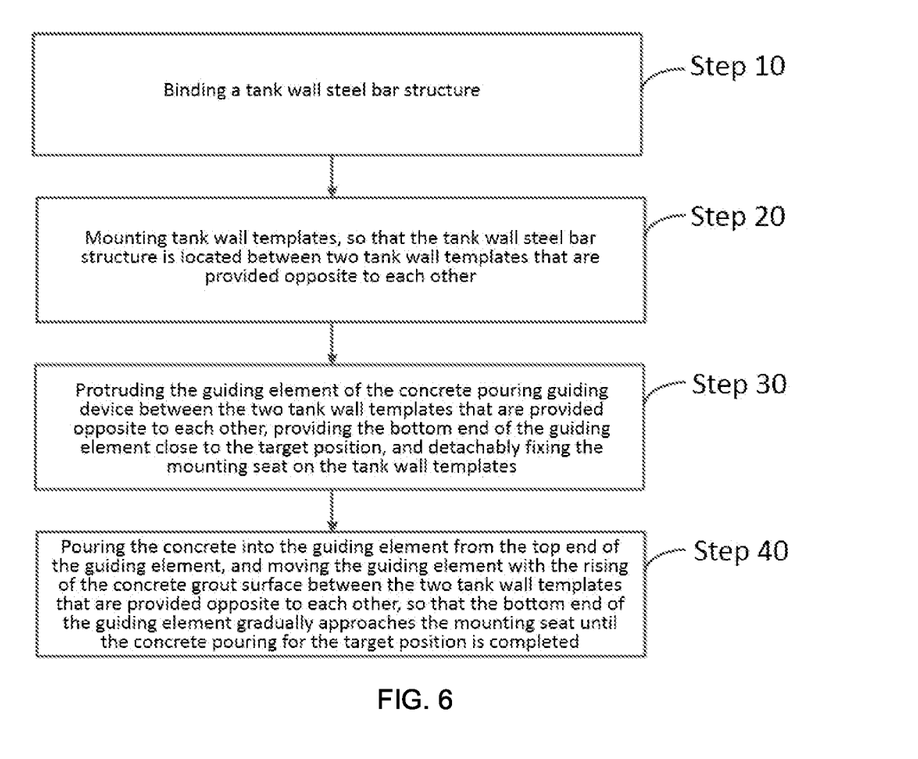
FIG. 6 is a schematic flowchart of a construction method for a sewage treatment tank provided in an embodiment of the present disclosure.

As shown in FIG. 6, in a third aspect, the present disclosure provides a construction method of a sewage treatment tank, specifically, a construction method of tank wall concrete pouring of a sewage treatment tank, wherein the method is implemented by applying the concrete pouring guiding device 100 provided in the embodiments of the present disclosure, and the method includes:

step 10: binding a tank wall steel bar structure;

step 20: mounting a tank wall template 300, so that the tank wall steel bar structure is located between two tank wall templates 300 that are provided opposite to each other;

step 30: protruding the guiding element 130 of the concrete pouring guiding device 100 between the two tank wall templates 300 that are provided opposite to each other, providing the bottom end of the guiding element 130 close to the target position, and detachably fixing the mounting seat 140 on the tank wall templates 300; and step 40: pouring the concrete into the guiding element 130 from the top end of the guiding element 130, and moving the guiding element 130 with the rising of the concrete grout surface between the two tank wall templates 300 that are provided opposite to each other, so that the bottom end of the guiding element 130 gradually approaches the mounting seat 140 until the concrete pouring for the target position is completed.

For the construction method of a sewage treatment tank provided in the embodiment of the present disclosure, by directly sending the concrete to the target position by applying the concrete pouring guiding device 100 provided in the embodiment of the present disclosure, the concrete can bypass the steel bar framework in the dropping process, thereby reducing the impact force and reducing the production of segregation. Meanwhile, the bottom end of the guiding element 130 is hardly blocked by the concrete grout surface by moving the guiding element 130 relative to the mounting seat 140, so that the concrete pouring can be carried out smoothly, and the construction efficiency is ensured.

Optionally, the tank wall steel bar structure includes two steel bar mesh units 200 provided in parallel to each other; the step 30 includes:

step 31: protruding the guiding element 130 of the concrete pouring guiding device 100 between the two steel bar mesh units 200 provided in parallel to each other, and providing the bottom end of the guiding element 130 close to the target position; and step 32: detachably fixing the mounting seat 140 to the two tank wall templates 300.

Figure 5:
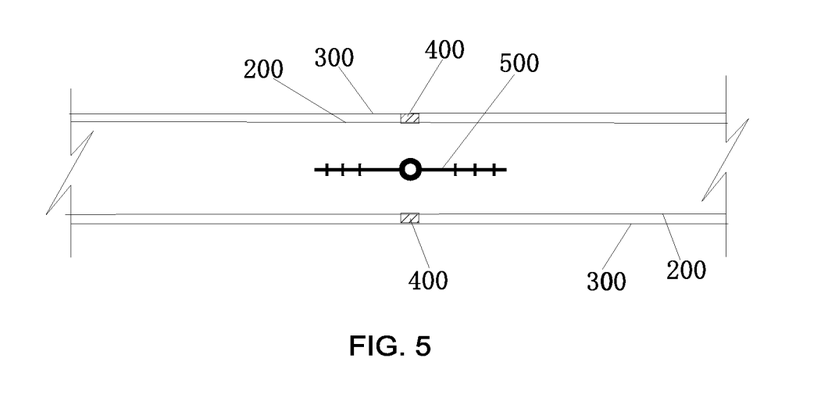
FIG. 5 is a top structural schematic view of a mounting manner of a waterstop belt provided in an embodiment of the present disclosure.

As shown in FIG. 5, optionally, before the step 20, the method further includes:

step 50: fixing a waterstop belt 500 between two steel bar mesh units 200 that are provided in parallel to each other, wherein the waterstop belt 500 may be a contraction joint rubber waterstop belt;

correspondingly, the step 20 includes:

step 21: providing, in a direction perpendicular to the steel bar mesh units 200, the tank wall templates 300 on two sides of the tank wall steel bar structure; and step 22: mounting a wedge-shaped wood block 400 on a board surface of a side of the tank wall template 300 facing the tank wall steel bar structure, so that a position of the wedge-shaped wood block 400 corresponds to a position of the waterstop belt 500, wherein the wedge-shaped wood block 400 has a strip structure.

Optionally, after the step 40, the method further includes:

step 60: removing the tank wall templates 300 and the wedge-shaped wood block 400, so that a groove, i.e. the contraction joint provided, is formed at a position corresponding to the wedge-shaped wood block 400 on the solidified concrete, and filling a waterproof material in the contraction joint.

In an embodiment of the present disclosure, according to a medium in the sewage treatment tank, the contraction joint rubber waterstop belt is selected first, wherein a chloroprene rubber waterstop belt is selected if the medium is weak acid and weak base; and a nitrile rubber waterstop belt needs to be selected if there is an oil medium. The width and thickness of the waterstop belt are selected according to the height of water level of the tank. In the present construction technology, the maximum water level of the tank in the Degremont process is not greater than 8 m, then the waterstop belt has a width not less than 300 mm and a thickness not less than 6 mm as required by specifications. The chloroprene rubber waterstop belt having a width of 330 mm and a thickness of 10 mm is generally selected. If the project is located in the cold northern region, a cold-resistant waterstop belt is selected, with a temperature range of −40~600° C. If the project is located in the southern region, a common waterstop belt may be selected, with a temperature range of −25~600° C. Materials are checked before entering the site, the deviation of a central annular hole of the waterstop belt is not allowed to exceed one-third of the wall thickness, the surface should not have defects such as cracks, sponginess, indentations, bubbles, impurities, and scars, and certificates of the materials are complete.

The rubber waterstop belt must be carefully installed to avoid the waterstop belt from being punctured by a steel bar head, or burnt by electrogas welding, and it is forbidden to provide holes, nail, thread an iron wire and the like on the body of the waterstop belt to damage the body. The installation position should be accurate and fixed firmly. After the steel bars are bound, the steel bars are constructed using the expansion joint, the waterstop belt is initially fixed, and then positioned using the positioning steel bars, thus ensuring correct and reliable position of the waterstop belt in the concrete. The method of fixing the rubber waterstop belt is based on the principle that the effective waterstop part of the waterstop belt body is not damaged.

For the construction of a circular secondary sedimentation tank, the conventional construction method of dividing blocks from the expansion joint is not used, but the bottom plate and the tank wall are poured with concrete at a single time, respectively, and the radius of a concrete track (top of the tank wall) of an agitator and quality of flatness should be ensured. Two sides of an expansion joint foam board are reinforced with a dense screen, and then strengthened with positioning steel bar, and positioning polyethylene foam board, which are used in cooperation with constructional steel bars of the expansion joint in installation, to prevent movement or breakage due to uneven stress in the process of pouring the concrete. In the process of pouring the concrete, the concrete is simultaneously delivered at the two sides of the expansion joint, so as to ensure that the height difference between the two sides is not excessively large, thus avoiding a large pressure generated by a too large height difference, to destroy the foam board. After demoulding, the positioning steel bars should not be exposed, and when the positioning steel bars are installed, a steel bar protection layer thickness is required.

The distance between the expansion joints is generally about 30 m, and an internal stress also will be generated between two expansion joints due to concrete shrinkage. When the internal stress is greater than a concrete tensile limit, concrete cracks are generated, and concrete leakage is caused. In view of this, it is necessary to provide the concrete contraction joint, so that the cracks generated thereby appear in the contraction joint. The contraction joints are all provided on the tank wall, preferably with the distance generally not more than 10 m.

The contraction joint and the expansion joint are different. The steel bar at the contraction joint is not required to be disconnected, and does not need to be separated by the foam board, then the configuration is simple, and the construction is convenient. The chloroprene rubber waterstop belt is mounted in the contraction joint.

The contraction joints in the concrete tank wall are vertical grooves of 30×30 mm on the two sides, and when the tank wall templates 300 are arranged, wood strips of 30×30 mm (the wood strip is trapezoidal, with small inside and large outside, then it is easily removed) are nailed on the tank wall templates 300, and the wood strip is exposed after the poured concrete is demoulded, and is easily taken out. The concrete cross section is reduced herein, then the stress is concentrated and larger than in other places, and the concrete is easily cracked here when it shrinks. There are generally two positioning steel bars of the contraction joint waterstop belt, one in the top and one in the middle, wherein a starting point of the positioning steel bar below is above a foundation bottom plate steel bar. The positioning steel bars also may be increased appropriately according to practical situation, but not too many, because if there are too many positioning steel bars, the effect of the contraction joint will be lost. The positioning steel bars clamp and straighten the waterstop belt to ensure that the waterstop belt is vertical, and the wood strip is installed in a middle part of the waterstop belt.

In order to better explain the solution provided in the present disclosure, the present disclosure further provides application examples of a three-section opposite-pull device, a tank wall template 300 assembly, and a construction method of a sewage treatment tank.

The oil refining and sewage treatment of chemical projects mostly adopt the degremont technology in our country, in which the sewage treatment process and the refining process or the chemical process are sufficiently combined to form an integral body, so that "waste" is used to treat "waste", and the "waste" is changed into valuable. The sewage treatment plant is both their terminal, and start point, which not only reduces the direct operation cost of enterprises, but also effectively reduces emission of contaminants.

In the construction process of the sewage treatment tank, it is important to control the construction quality of the tank, and prevent the tank leakage, which contaminates the environment, and affects the service life of the project. Therefore, an effective measure must be adopted to ensure construction quality and construction progress. The present construction technology mainly includes: (1) the shrinkage compensating concrete is adopted to effectively compensate for the concrete shrinkage, thereby effectively preventing the concrete shrinkage and cracking; (2) a three-section combined-type waterstop opposite-pull rod is adopted and can be reused, then the construction cost is saved; (3) using the present construction technology effectively ensures the construction quality of the expansion joint and the contraction joint, and avoids leakage; (4) a self-made concrete elephant trunk (string barrel) is used for construction, then the concrete is effectively sent to the pouring site, thereby avoiding the concrete segregation phenomenon; (5) a self-made water drenching (water spraying) maintenance system is adopted to ensure the concrete maintenance quality; (6) the bottom plate and the tank wall of the secondary sedimentation tank are provided with the expansion joint, respectively, poured with the concrete integrally, thereby accelerating the construction progress, and ensuring the radius and flatness quality of the concrete track (top of the tank) of a concrete scraper; (7) a biochemical tank takes the expansion joint as a boundary, and is constructed from one flow section to another, thus accelerating the construction speed, and improving the utilization rate of the materials; and (8) using the present technology for leakage prevention and plugging eliminates worries about future use of the tank, and ensures normal use of the tank in the sewage treatment.

In the present application example, (1) the construction and installation technology of the rubber waterstop belt ensures no water seepage and no water leakage of the expansion joints.

Before installing the rubber waterstop belt, the steel bars are first bound. The steel bars must have factory certificate when entering the site, and the steel bars can be used after passing the field re-inspection. Before the steel bars are delivered, a technician should check a delivery table of a steel bar team, and in a relatively complicated case, lofting should be performed. Meanwhile, the technician should make comprehensive and systematic technical disclosure and safety disclosure to the steel bar operation team and group. During the steel bar construction, the construction is carried out strictly according to the design drawing and the construction acceptance standard requirements, wherein the process control is combined with routing inspection, sampling inspection, and full inspection, and problems are found and corrected in time. Especially for a circular tank wall, the radius size deviation must be controlled within an allowable range when the steel bars are bound so as to prevent the influence on the subsequent processes and the incapability of adjusting a formwork in place.

For the installation of the rubber waterstop belt of the expansion joint of the tank, the rubber waterstop belt body is easily damaged by the conventional construction method, or torn when stressed due to inaccurate position, so that water seepage occurs. By adopting the present construction method, the installation position is accurate and firm, in construction, the expansion joint is utilized to construct the steel bars, the steel bars are initially fixed, and then accurately positioned and reinforced with the positioning steel bars, so that the waterstop belt is ensured not to shift and be damaged in the concrete pouring process, and it facilitates free stretching of the rubber waterstop belt under the stress condition.

For the construction for a large circular secondary sedimentation tank, the conventional construction method of dividing blocks from the expansion joint is not used, but the bottom plate and the tank wall are poured with concrete at a single time, respectively, and the radius of a concrete track (top of the tank wall) of an agitator and quality of flatness should be ensured.

According to a medium in the sewage treatment tank, the rubber waterstop belt is selected first, wherein a chloroprene rubber waterstop belt is selected if the medium is weak acid and weak base; and a chloroprene rubber waterstop belt needs to be selected if there is an oil medium. The width and thickness of the waterstop belt are selected according to the height of water level of the tank. In the present construction technology, the maximum water level of the tank in the Degremont process is not greater than 8 m, then the waterstop belt has a width not less than 300 mm and a thickness not less than 6 mm as required by specifications. The chloroprene rubber waterstop belt having a width of 330 mm and a thickness of 10 mm is generally selected. If the project is located in the cold northern region, a cold-resistant waterstop belt is selected, with a temperature range of −40~600° C. If the project is located in the southern region, a common waterstop belt may be selected, with a temperature range of −25~600° C. Materials are checked before entering the site, the deviation of a central annular hole of the waterstop belt is not allowed to exceed one-third of the wall thickness, the surface should not have defects such as cracks, sponginess, indentations, bubbles, impurities, and scars, and certificates of the materials are complete.

The rubber waterstop belt must be carefully installed to avoid the waterstop belt from being punctured by a steel bar head, or burnt by electrogas welding, and it is forbidden to provide holes, nail, thread an iron wire and the like on the body of the waterstop belt to damage the body. The installation position should be accurate and fixed firmly. After the steel bars are bound, the steel bars are constructed using the expansion joint, the waterstop belt is initially fixed, and then positioned using the positioning steel bars, thus ensuring correct and reliable position of the waterstop belt in the concrete. The method of fixing the rubber waterstop belt is based on the principle that the effective waterstop part of the waterstop belt body is not damaged.

For the construction of a circular secondary sedimentation tank, the conventional construction method of dividing blocks from the expansion joint is not used, but the bottom plate and the tank wall are poured with concrete at a single time, respectively, and the radius of a concrete track (top of the tank wall) of an agitator and quality of flatness should be ensured. Two sides of an expansion joint foam board are reinforced with a dense screen, and then strengthened with positioning steel bar, and positioning polyethylene foam board, which are used in cooperation with constructional steel bars of the expansion joint in installation, to prevent movement or breakage due to uneven stress in the process of pouring the concrete. In the process of pouring the concrete, the concrete is simultaneously delivered at the two sides of the expansion joint, so as to ensure that the height difference between the two sides is not excessively large, thus avoiding a large pressure generated by a too large height difference, to destroy the foam board. After demoulding, the positioning steel bars should not be exposed, and when the positioning steel bars are installed, a steel bar protection layer thickness is required.

(2) The three-section combined-type opposite-pull device is reused, thus facilitating the cost reduction and efficiency improvement.

When the construction method with the conventional tank opposite-pull screw is adopted, it is difficult to remove the exposed opposite-pull screw head, the workload is increased, and a butt-joint screw head cannot be reused. Adopting the three-section combined opposite-pull screw reduces the workload of processing the opposite-pull screw head, and the opposite-pull screw can be reused, thus the construction cost is reduced.

The three-section combined opposite-pull screw adopted reduces the workload of processing the opposite-pull screw head, and can be reused. The length of the middle section and the thickness of rubber pads at two ends are the thickness of the tank wall, the length at the two ends should be both 200~250 mm, the middle section is welded with a waterstop ring, the distance between the opposite-pull screws (the horizontal and vertical distances are generally 500 mm) should be determined by calculation, the opposite-pull screws should be horizontally and vertically straight, and the spacing of the opposite-pull screw holes on the concrete surface after demoulding is uniform, and is horizontally and vertically straight.

For the three-section combined-type opposite-pull screw, the screw head of the exposed part is screwed off before the tank wall template is removed, the rubber pads are chiseled off after demoulding, and waterproof mortar is used for compacting and polishing. If the conventional construction method is adopted, and a common waterstop opposite-pull screw is adopted, when the exposed opposite-pull screw head is removed, a hammer is used for breaking the opposite-pull screw head before demoulding, so that the opposite-pull screw cannot be reused, and it is difficult to remove the screw head at the root part.

The height of the tank wall template of the secondary sedimentation tank should be the same as or properly higher than the height of the concrete surface of a track of an agitator, and after the template has been supported and reinforced, a gradienter is used for detection, wherein if the tank wall template has a high part, the inside of the tank wall template is nailed (the spacing is 500 mm), and positions of the nails are concrete surface elevation. The concrete finish surface needs to be subjected to initial finishing, medium finishing, and final finishing, and the flatness is controlled by a scraper, wherein during initial finishing, the concrete surface needs to be measured with a gradienter for elevation, and strictly controlled. The present construction technology achieves the expected effects by inspecting the secondary sedimentation tank, the floatation tank, and the grease-removal tank, the track concrete surface, and the radius, and succeeds in installation and trial run at one time.

(3) Application of shrinkage compensating concrete and effective compensation for concrete shrinkage.

The common concrete capacity shrinkage produces shrinkage cracks, then the shrinkage compensating concrete is adopted to effectively compensate for concrete shrinkage, thereby avoiding shrinkage cracks caused by concrete shrinkage.

Shrinkage compensating concrete: the shrinkage compensating concrete is adopted to effectively compensate for the concrete shrinkage, the expansion ratio is restricted to 0.015~0.03%, the bottom plate is not less than 0.015%, and the tank wall is 0.02~0.03%. The concrete performance should be determined by a test, and the raw materials should comply with provisions of relevant specifications. Currently, commodity concrete is adopted, and the technical requirements related to the seepage-resistant concrete should be sent in advance to the commodity concrete station, so as to facilitate trial test and test in advance, and the concrete can be used in the project after meeting the requirements.

(4) The tank wall concrete pouring adopts a self-made delivery string barrel, which effectively avoids the segregation phenomenon.

In the conventional concrete pouring process, the concrete is directly delivered into the tank wall, but in the delivering process, subjected to an impact force and blocked by the steel bar framework, the concrete may be ultrahigh and get segregated. The self-made concrete delivering string barrel is inserted into the tank wall (the spacing is about 5 m), and the concrete is delivered from the string barrel directly to a pouring site, thus avoiding generation of segregation. The self-made concrete string barrel is simple, economical, convenient to move, and is used many times.

Anti-segregation measure of concrete: in the process of concrete pouring, the concrete should be avoided from segregation due to the impact force and the blocking of the steel bar framework in the delivery, and when the delivery height exceeds 2 m, the concrete string barrel or elephant trunk is used. In the construction of the tank wall concrete, a self-made string barrel of PVC tube is adopted and inserted into the tank wall with the spacing of about 5 m, and a pump tube of a pumper is inserted into the string barrel, and the concrete is directly delivered from inside the tube to the pouring site to avoid segregation. The self-made concrete string barrel in the present construction technology is simple, economical, convenient to move, and is used many times.

(5) An automatic water spraying and sprinkling maintenance system is adopted for concrete maintenance, thus ensuring the concrete maintenance quality.

Conventionally, concrete is maintained by workers by watering, but the tank wall is weather-beaten and dried quickly, and the concrete surface capacity shrinks and generates cracks, which affects the concrete quality. With a self-made concrete watering and maintenance system, the automatic water sprinkling system is provided along the periphery or in the middle of the tank wall, then the concrete surface is kept wet all the time. Through the practice of a plurality of projects, compared with manual watering and maintenance, arranging a porous water sprinkling line for 24 hours uninterrupted maintenance significantly reduces the cracks of the tank wall, especially in the high-temperature summer and windy seasons, the superiority of such maintenance method is particularly outstanding.

The concrete maintenance adopts an automatic spraying and automatic sprinkling system: after the large-area concrete pouring of the bottom plate, the top plate and so on is completed, the concrete is covered with cotton felt in time, and maintained by watering. After the tank wall is demoulded, the effect of the conventional practice of adopting the cotton felt for covering and the watering and maintenance is not ideal after a plurality of projects. The present construction technology adopts the self-made concrete watering and maintenance system: water is introduced using a pipe of $\varphi 50$ from a water source, and then divided into several branches by pipes of $\varphi 20$ disposed along the edge or in the middle of the tank wall, and the pipes of $\varphi 20$ are pinned (porous water-sprinkling pipes), with a spacing of about 100 mm, the water source is connected, and 24 hours automatic water sprinkling and maintenance is ensured. When the tank wall is difficult to be manually watered, automatically sprinkled for maintenance, and covered for maintenance, after the concrete maintenance period is expired, the tank wall templates are removed, and the concrete is moisturized and maintained with the tank wall templates, which has the disadvantage of reducing the usage rate of the material. Through the practice of a plurality of projects, compared with manual watering and maintenance, arranging the porous water sprinkling line for 24 hours uninterrupted maintenance significantly reduces the cracks of the tank wall, especially in the high-temperature summer and windy seasons, the superiority of such maintenance method is particularly outstanding.

(6) A concrete contraction joint is added to the tank wall, and the shrinkage cracks appear at the contraction joint, preventing water seepage.

In the conventional tank construction, the tank wall is not provided with the contraction joint, and when the concrete shrinks, the shrinkage cracks easily appear and cause water seepage. The tank wall contraction joint is additionally provided, a rubber waterstop belt is installed in the contraction joint, and the shrinkage cracks generated by the concrete shrinkage appear at the position of contraction joint, thereby effectively preventing the phenomenon of generating cracks and water seepage due to the tank wall shrinkage.

The distance between the expansion joints is generally about 30 m, and an internal stress also will be generated between two expansion joints due to concrete shrinkage. When the internal stress is greater than a concrete tensile limit, concrete cracks are generated, and concrete leakage is caused. In view of this, it is necessary to provide the concrete contraction joint, so that the cracks generated thereby appear in the contraction joint. The contraction joints are all provided on the tank wall, preferably with the distance generally not more than 10 m.

The contraction joint and the expansion joint are different. The steel bar is not required to be disconnected, and does not need to be separated by the foam board, then the configuration is simple, and the construction is convenient. The chloroprene rubber waterstop belt is mounted in the contraction joint, to serve the waterstop function.

The contraction joints in the concrete tank wall are vertical grooves of 30×30 mm on the two sides, and when the tank wall templates are arranged, wood strips of 30×30 mm (the wood strip is trapezoidal, with small inside and large outside, then it is easily removed) are nailed on the tank wall templates, and the wood strip is exposed after the poured concrete is demoulded, and is easily taken out. The concrete cross section is reduced herein, then the stress is concentrated and larger than in other places, and the concrete is easily cracked here when it shrinks. There are generally two positioning steel bars of the contraction joint waterstop belt, one in the top and one in the middle, wherein a starting point of the positioning steel bar below is above a foundation bottom plate steel bar. The positioning steel bars also may be increased appropriately according to practical situation, but not too many, because if there are too many positioning steel bars, the effect of the contraction joint will be lost. The positioning steel bars clamp and straighten the waterstop belt to ensure that the waterstop belt is vertical, and the wood strip is installed in a middle part of the waterstop belt.

(7) Concrete defects and water seepage are repaired, to ensure no worries about future use.

For the repair of concrete defects and the treatment of water seepage and leakage during water test, the conventional treatment method easily causes the phenomenon of subsequent water seepage. The repair is performed using a plurality of treatment methods or a combination of treatment methods, thereby ensuring that the phenomenon of water seepage and leakage no longer appears in the use process of the project. From several sewage treatment application conditions, it is seen that the effects are obvious, without worries about future use.

Concrete defect repair before water injection to the tank: concrete cracks and construction cold joints are checked, and a "V" groove is opened in the joint, with the depth of 10~20 mm, and the width of 10~20 mm, and the groove is washed clean, and dried. Epoxy resin, polysulfide rubber, cement, and sand (the ratio is 10:3:12.5:28) are taken, the sand and cement are proportioned and stirred evenly, then epoxy resin and polysulfide rubber are also stirred evenly in proportion, and then mixed in the stirred mortar to be stirred, finally, the stirred mortar is diluted with a small amount of acetone to moderate consistency. The already stirred epoxy resin mortar is embedded in the opened concrete groove washed clean and dried, and compacted and polished. Repair of voids and pits: loosened pebbles are chiseled away, the concrete is rinsed clean, repaired with cement mortar and a micro-expansion agent, or repaired with Water-does-not-leak and Repair the lear, then maintenance is carried out after the repair, and an epoxy resin also may be used for repair. Repair of holes: after the loosened pebbles are chiseled away from the voids and pits, holes are formed in severe conditions, and after the holes are rinsed clean, the holes are repaired with high-strength non-shrinkage grout.

Storing water in the tank and then plugging the tank (tank plugging with water in the tank): a groove is chiseled from the tank for concrete leakage repair, wherein after the tank is injected with water, concrete cracks leak, and a quick-setting waterproof material is used for repair. A 20 mm deep small groove is chiseled along the leaking crack. After the groove is chiseled out, the groove is blocked with a quick-setting waterproof material such as Water-does-not-leak and Repair the lear. The concrete seepage and leakage is repaired by grouting. Polyurethane or epoxy resin waterproof slurry is poured by a high-pressure grouting pump to fill concrete gaps with the cement slurry, then the cement slurry expands when meeting water and blocks water from leaking along the gaps. A grouting needle is 90 mm long, and a drilling depth is 80 mm. The grouting needle is put in and screwed with a wrench. The grouting is carried out until the grout overflows from an eyelet or the gap, then a few minutes later, the grouting is carried out once again. The repair is carried out until no water seepage or leakage occurs.

Finally, it should be indicated that the various embodiments above are merely used for illustrating the technical solutions of the present disclosure, rather than limiting the present disclosure. While the detailed description is made to the present disclosure with reference to the various preceding embodiments, those ordinarily skilled in the art should understand that they still could modify the technical solutions recited in the various preceding embodiments, or make equivalent substitutions to some or all of the technical features therein. These modifications or substitutions do not make the essence of the corresponding technical solutions depart from the scope of the technical solutions of the various embodiments of the present disclosure.

What is claimed is:

1. A concrete pouring guiding device, comprising a guiding element and a mounting seat configured to be fixed on an external mounting position, wherein the guiding element is threadedly engaged with the mounting seat, so as to enable the guiding element to move in a first direction with respect to the mounting seat; in the first direction, one end of the guiding element is configured to allow concrete to flow into the guiding element, and the other end of the guiding element is configured to extend to a target position; and the first direction is a length direction of the guiding element;

wherein the mounting seat is provided with two clamping grooves, wherein the two clamping grooves are symmetrically provided on two sides of the guiding element in a second direction, and the clamping grooves are configured to be snap-fitted with the external mounting position;

wherein a clamping block is provided in each of the clamping grooves, the concrete pouring guiding device further comprises a locking bolt, a threaded hole cooperating with the locking bolt is provided in the mounting seat, the locking bolt extends through the threaded hole into a corresponding clamping groove, and the locking bolt is movably connected to the clamping block, so that the clamping block is movable in the second direction driven by the locking bolt;

wherein the guiding element comprises a receiving cylinder and a guiding cylinder sleeved together, so that the receiving cylinder and the guiding cylinder are movable relative to each other in the first direction; and an external thread cooperating with the mounting seat is provided on an outer wall of the guiding cylinder; and a rotation handle for rotating the guiding cylinder is fixed on the guiding cylinder, and a fixed handle is fixed on the receiving cylinder.

2. The concrete pouring guiding device according to claim 1, wherein the concrete pouring guiding device further comprises a locking bolt, a threaded hole cooperating with the locking bolt is provided in the mounting seat, the locking bolt extends through the threaded hole into a corresponding clamping groove, two locking bolts are mounted at one clamping groove, and the two locking bolts are provided opposite to each other.

3. The concrete pouring guiding device according to claim 2, wherein in the first direction, a middle part of the guiding element is an external thread section, and two ends of the guiding element in the first direction both have a smooth outer wall.

4. The concrete pouring guiding device according to claim 2, wherein a handle assembly is mounted on the guiding element, wherein the handle assembly comprises two arc-shaped clamping sheets and two handles; the two arc-shaped clamping sheets are connected by a bolt, and a concave side of one of the arc-shaped clamping sheets is provided opposite to a concave side of the other one of the arc-shaped clamping sheets, so that the guiding element is clamped between the two arc-shaped clamping sheets; and the two arc-shaped clamping sheets are each mounted with one of the handles.

5. The concrete pouring guiding device according to claim 1, wherein in the first direction, a middle part of the guiding element is an external thread section, and two ends of the guiding element in the first direction both have a smooth outer wall.

6. The concrete pouring guiding device according to claim 1, wherein a handle assembly is mounted on the guiding element, wherein the handle assembly comprises two arc-shaped clamping sheets and two handles; the two arc-shaped clamping sheets are connected by a bolt, and a concave side of one of the arc-shaped clamping sheets is provided opposite to a concave side of the other one of the arc-shaped clamping sheets, so that the guiding element is clamped between the two arc-shaped clamping sheets; and the two arc-shaped clamping sheets are each mounted with one of the handles.

7. The concrete pouring guiding device according to claim 1, wherein in the first direction, a middle part of the guiding element is an external thread section, and two ends of the guiding element in the first direction both have a smooth outer wall.

8. The concrete pouring guiding device according to claim 1, wherein in the first direction, a middle part of the guiding element is an external thread section, and two ends of the guiding element in the first direction both have a smooth outer wall.

9. The concrete pouring guiding device according to claim 1, wherein a handle assembly is mounted on the guiding element, wherein the handle assembly comprises two arc-shaped clamping sheets and two handles; the two arc-shaped clamping sheets are connected by a bolt, and a concave side of one of the arc-shaped clamping sheets is provided opposite to a concave side of the other one of the arc-shaped clamping sheets, so that the guiding element is clamped between the two arc-shaped clamping sheets; and the two arc-shaped clamping sheets are each mounted with one of the handles.

10. The concrete pouring guiding device according to claim 1, wherein a handle assembly is mounted on the guiding element, wherein the handle assembly comprises two arc-shaped clamping sheets and two handles; the two arc-shaped clamping sheets are connected by a bolt, and a concave side of one of the arc-shaped clamping sheets is provided opposite to a concave side of the other one of the arc-shaped clamping sheets, so that the guiding element is clamped between the two arc-shaped clamping sheets; and the two arc-shaped clamping sheets are each mounted with one of the handles.

11. A construction method for a sewage treatment tank, wherein the method is implemented by applying the concrete pouring guiding device according to claim 1, and the method comprises:
    forming a tank wall steel bar structure by binding;
    mounting tank wall templates, so that the tank wall steel bar structure is located between two tank wall templates that are provided opposite to each other;
    making the guiding element of the concrete pouring guiding device protrude into between the two tank wall templates that are provided opposite to each other, arranging a bottom end of the guiding element close to the target position, and detachably fixing the mounting seat on the tank wall templates; and
    pouring the concrete into the guiding element from a top end of the guiding element, and moving the guiding element with a rising of a concrete grout surface between the two tank wall templates that are provided opposite to each other, so that the bottom end of the guiding element gradually approaches the mounting seat until the concrete pouring for the target position is completed.

12. The construction method for a sewage treatment tank according to claim 11, wherein the tank wall steel bar structure comprises two steel bar mesh units provided in parallel to each other;
    the step of making the guiding element of the concrete pouring guiding device protrude into between the two tank wall templates that are provided opposite to each other, arranging a bottom end of the guiding element close to the target position, and detachably fixing the mounting seat on the tank wall templates comprises
    making the guiding element of the concrete pouring guiding device protrude into between the two steel bar mesh units provided in parallel to each other, and arranging the bottom end of the guiding element close to the target position; and
    detachably fixing the mounting seat to the two tank wall templates.

13. The construction method for a sewage treatment tank according to claim 12, wherein before the mounting tank wall templates so that the tank wall steel bar structure is located between two tank wall templates that are provided opposite to each other, the method further comprises:
    fixing a waterstop belt between the two steel bar mesh units that are provided in parallel to each other; and
    correspondingly, the step of mounting tank wall templates so that the tank wall steel bar structure is located between two tank wall templates that are provided opposite to each other comprises:
    providing, in a direction perpendicular to the steel bar mesh units, the tank wall templates on two sides of the tank wall steel bar structure; and
    mounting a wedge-shaped wood block on a board surface of a side of each of the tank wall templates facing the tank wall steel bar structure, so that a position of the wedge-shaped wood block corresponds to a position of the waterstop belt; and
    after the pouring concrete into the guiding element from a top end of the guiding element and moving the guiding element with a rising of a concrete grout surface between the two tank wall templates that are provided opposite to each other so that a bottom end of the guiding element gradually approaches the mounting seat until the concrete pouring for the target position is completed, the method further comprises:
    removing the tank wall templates and the wedge-shaped wood block, so that a contraction joint is formed at a position corresponding to the wedge-shaped wood block on solidified concrete, and filling a waterproof material in the contraction joint.

* * * * *